(12) United States Patent
Polychroniou et al.

(10) Patent No.: US 11,308,093 B1
(45) Date of Patent: Apr. 19, 2022

(54) ENCODING SCHEME FOR NUMERIC-LIKE DATA TYPES

(71) Applicant: Amazon Technologies, Inc., Seattle, WA (US)

(72) Inventors: Orestis Polychroniou, San Francisco, CA (US); Naresh Chainani, Mountain View, CA (US); Ippokratis Pandis, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 16/714,576

(22) Filed: Dec. 13, 2019

(51) Int. Cl.
| G06F 16/2455 | (2019.01) |
| G06F 16/174 | (2019.01) |
| G06F 16/23 | (2019.01) |
| G06F 16/22 | (2019.01) |

(52) U.S. Cl.
CPC .... G06F 16/24568 (2019.01); G06F 16/1744 (2019.01); G06F 16/221 (2019.01); G06F 16/2358 (2019.01)

(58) Field of Classification Search
CPC ........... G06F 16/24568; G06F 16/2358; G06F 16/221; G06F 16/1744
See application file for complete search history.

(56) References Cited

U.S. PATENT DOCUMENTS

| 8,606,029 | B1* | 12/2013 | Wong | ..................... | H04N 19/17 |
| | | | | | 382/239 |
| 9,405,764 | B1* | 8/2016 | Wallace | ................ | G06F 3/0608 |
| 2009/0240708 | A1* | 9/2009 | Miceli | .................. | G11B 27/105 |
| 2015/0052103 | A1* | 2/2015 | Huang | ................ | G06F 16/1756 |
| | | | | | 707/610 |
| 2015/0319441 | A1* | 11/2015 | Puri | ........................ | H04N 19/14 |
| | | | | | 375/240.02 |
| 2019/0088265 | A1* | 3/2019 | Hirabayashi | .......... | G06F 16/122 |
| 2020/0250193 | A1* | 8/2020 | Pham | ................ | G06F 16/24545 |
| 2021/0250617 | A1* | 8/2021 | Hannuksela | ....... | H04N 21/2358 |

OTHER PUBLICATIONS

D. Lemire et al, "Decoding Billions of Integers per Second Through Vectorization", dated May 15, 2014, pp. 1-30.
Orestis Polychroniou et al, "Efficient Lightweight Compression Alongside Fast Scans", dated Jun. 1, 2015, pp. 1-6.
Marcin Zukowski et al, "Super-Scalar RAM-CPU Cache Compression", pp. 1-12.

* cited by examiner

*Primary Examiner* — Dangelino N Gortayo
(74) *Attorney, Agent, or Firm* — Robert C. Kowert; Kowert, Hood, Munyon, Rankin & Goetzel, P.C.

(57) ABSTRACT

A method includes encoding, by an encoding engine, consecutive sections of a received data stream that includes a stream of values. The encoding includes identifying a minimum value in a section of the stream. The encoding includes determining, for each value in the section of the stream, respective differences with the minimum value. An encoded version of the section includes the minimum value and a mask value. The mask value is combined with respective portions of the respective differences to generate the respective differences of each value in the section. The encoded version of the section further includes the respective portions of the respective differences.

20 Claims, 8 Drawing Sheets

ENCODING SCHEME FOR NUMERIC-LIKE DATA TYPES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

Figure 1:
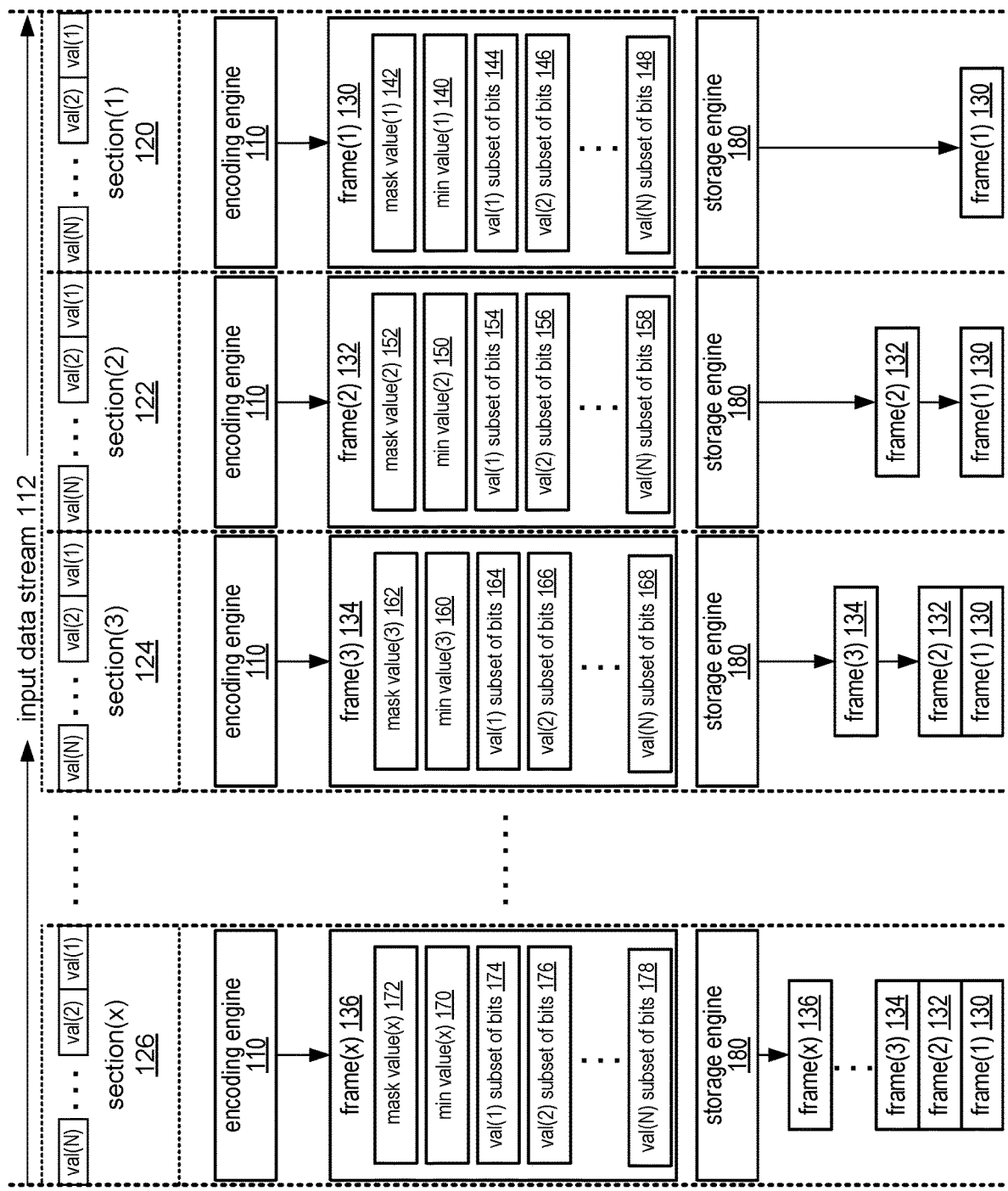
FIG. 1 is a logical block diagram illustrating an encoding scheme for compressing numeric-like data types, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for compressing data to be stored in a data store according to a high-performance high-efficiency compression algorithm for numeric-like data types are described herein. A data store, such as a database management service (e.g., a distributed data warehouse system), or other data storage and/or management system may store data for various clients, entities, organizations, or individuals. The data store may be implemented using a variety of different configurations and schemes. For example, in some embodiments a data management system may implement column oriented database tables (hereinafter referred to as "columnar database tables") to provide efficient data management for clients.

Frame-of-reference (FOR) is a compression algorithm that is applied in large sequences of numbers, leading to a larger value range for the frame and thus more bits per number. To address this issue, one approach is to store outlier values separately from the rest of the sequence, a technique called "patching". Patched-frame-of-reference (PFOR) allows the compression algorithm to consider some numbers as outliers and store them separately from the rest of the frame. Other frame-of-reference algorithms exist including compressing the exception values as well. However, instead of relying on exceptions over large sequences of values per frame, the compression algorithm of the present disclosure relies on using small frames of values to constantly reposition the minimum (min) value and to mitigate the overhead of outliers. One advantage of using small frames of values (e.g., 64 values per frame in a particular implementation) is that it achieves high compression ratio without the need for patching. Moreover, compression becomes faster since there is no need to detect outlier values. Decompression also becomes faster since there is no additional phase in the algorithm to "patch" the exception values back into the decompressed data.

A delta encoding scheme stores the difference from the previous number. In one approach, if the difference is smaller than a certain number, a smaller processor word size may be utilized to store it. However, this approach has data dependencies since each value is dependent on the exactly previous value. The compression algorithm of the present disclosure instead stores the difference from the minimum value for every value in a particular frame. Having a relatively small number of values in a frame (e.g., 64 values per frame) removes the data dependency. Further having at least 64 values per frame allows for data-parallel instructions (i.e., single-instruction-multiple-data or "SIMD") for decompression, offering a substantial boost in performance via hardware acceleration. The compression algorithm of the present disclosure is implemented for both AVX2 (Advanced Vector Extensions 2) and AVX-512 (512-bit AVX) SIMD instruction sets.

The compression algorithm of the present disclosure does not store the difference from the minimum value in the frame but instead stores only the subset of bits that differ. Subtracting the minimum value effectively removes the common most significant bits but retains the common least significant bits. Instead, the compression algorithm of the present disclosure uses a mask per frame to denote which bits to store for the particular frame of values. This eliminates the least significant bits as well.

For frames where all values are the same, the compression algorithm of the present disclosure may use additional bytes to store a number of repeats similar to run-length encoding. This allows the compression algorithm of the present disclosure to store long repeats of the same value even more effectively than the stand-alone version of run-length encoding of some approaches. The same idea may be used for the bitmap of nulls stored according to the compression algorithm of the present disclosure, where the last set of bits (e.g., 64 bits) use additional bytes to store the number of repeats if all values in the frame are null or if all values in the frame are non-null. Thus, the compression algorithm of the present disclosure stores a very large number of nulls very effectively and minimizes the size of the null bitmap when the values are exclusively non-null.

Referring to FIG. 1, a logical block diagram illustrates an encoding scheme for compressing numeric-like data types, according to some embodiments.

FIG. 1 illustrates that an encoding engine 110 may be configured to receive an input data stream 112 that includes a stream of values. The encoding engine 110 may be configured to encode consecutive sections of the input data stream 112 into respective frames. The stream of values may include a relatively large number of values, and the encoding engine 110 may be configured to encode a relatively small subset of the values (representing a "section" of the input data stream) into each individual frame. To illustrate, each section of the input data stream 112 may include a particular number (N) of values, which may be a predetermined fixed number of values for a particular encoding scheme. For example, the particular number (N) of values may correspond to sixty four (64) values, in some implementations. Various reasons for utilizing at least 64 values per frame are discussed herein with regard to the detailed description of the encoding engine 110 presented in FIG. 4. For example, 64 values is a large enough number of values to be vectorizable. The input data stream 112 may include one or more of the following numeric-like data types: smallint (16-bit); integer (32-bit); bigint (64-bit); numeric/decimal (64-bit & 128-bit); date (32-bit); and timestamp[tz] (64-bit). The types that are not supported by the encoding scheme include: bool; char; varchar; float4 (C++ float); and float8 (C++ double).

In the example depicted in FIG. 1, the consecutive sections of the input data stream 112 correspond to a first section 120, followed by a second section 122, followed by a third section 124. In FIG. 1, an ellipsis is used to illustrate that additional consecutive sections may follow the third section 124, with a last section 126 of the input data stream 112 identified as "section(x)" in FIG. 1. FIG. 1 illustrates that each of the sections 120-126 of the input data stream 112 may include a subset of N values (identified as "val(1)" through "val(N)"), with N corresponding to sixty four (64) values in some embodiments. In FIG. 1, dashed lines are used to illustrate that a first subset of N values are associated with the first section 120 of the input data stream 112, and a second subset of N values is associated with a next consecutive section of the input data stream 112 following the first section 120 (i.e., the second section 122). Similarly, dashed lines are used to illustrate that a third subset of N values is associated with a next consecutive section of the input data stream 112 following the second section 122 (i.e., the third section 124). An ellipsis illustrates additional consecutive sections may follow the third section 124 of the input data stream 112. While not shown in FIG. 1, a subset of N values may be associated with each of the additional consecutive sections of the input data stream 112 following the third section 124. Dashed lines are used to illustrate that a last subset of N values is associated with a last consecutive section of the input data stream 112 (i.e., the last section 126).

FIG. 1 illustrates that the encoding engine 110 may be configured to encode the first section 120 of the input data stream 112 into a first frame 130, to encode the second section 122 of the input data stream 112 into a second frame 132, and to encode the third section 124 of the input data stream 112 into a third frame 134. The encoding engine 110 may continue to encode additional consecutive sections of the input data stream 112 into additional frames. FIG. 1 illustrates that the encoding engine 110 may encode the last section 126 of the input data stream 112 into a last frame 136 (identified as "frame(x)" in FIG. 1).

To encode the first section 120 of the input data stream 112 into the first frame 130, the encoding engine 110 may be configured to identify a minimum value in the first section 120. That is, the encoding engine 110 may evaluate each value of the first subset of N values associated with the first section 120 (i.e., "val(1)" through "val(N)") of the input data stream 112 to identify the minimum value in the first section 120. The encoding engine 110 may be configured to store, in the first frame 130, the minimum value in the first section 120 as a first minimum value 140 (identified as "min value(1)" in FIG. 1).

The encoding engine 110 may be configured to determine, for each value in the first section 120, respective differences with the first minimum value 140 in the first section 120. That is, the encoding engine 110 may subtract the first minimum value 140 from each individual value of the first subset of N values associated with the first section 120, to determine individual differences from the first minimum value 140. To illustrate, for the first value in the first section 120 (i.e., "val(1)"), the encoding engine 110 may subtract the first minimum value 140 from the first value to determine a first difference associated with the first value. For the second value in the first section 120 (i.e., "val(2)"), the encoding engine 110 may subtract the first minimum value 140 from the second value to determine a second difference associated with the second value. For subsequent values in the first section 120 (i.e., values through "val(N)"), the encoding engine 110 may subtract the first minimum value 140 from each individual value to determine corresponding differences associated with each of the individual values.

The encoding engine 110 may be configured to determine, for each of the individual values in the first section 120 of the input data stream 112, a subset of bits that differ from bits of the first minimum value 140 based on the corresponding differences associated with each of the individual values. As an example, for the first value ("val(1)") in the first section 120, the first difference from the first minimum value 140 may be represented by a first set of bits. The encoding engine 110 may compare the first set of bits to bits of the first minimum value 140 to identify, for the first value, particular bits that differ from the bits of the first minimum value 140. As another example, for the second value ("val(2)") in the first section 120, the second difference from the first minimum value 140 may be represented by a second set of bits.

The encoding engine 110 may compare the second set of bits to the bits of the first minimum value 140 to identify, for the second value, particular bits that differ from the bits of the first minimum value 140. In a similar manner, the encoding engine 110 may identify particular bits that differ from the bits of the first minimum value 140 for subsequent values in the first section 120, through the Nth value in the first section 120.

The encoding engine 110 may be configured to determine a mask to identify a subset of bits to be stored in the first frame 130 for each individual value in the first section 120. The encoding engine 110 may be configured to store, in the first frame 130, a first mask value 142 (identified as "mask value(1)" in FIG. 1) that is combined with respective portions of the respective differences to generate the respective differences of each value in the first section 120. The encoding engine 110 may be configured to store, in the first frame 130, the respective portions of the respective differences. In the embodiment depicted in FIG. 1, the first mask value 142 is stored as an initial value in the first frame 130, the first minimum value 140 as a next value in the first frame 130, and the subset of bits for each individual value for the first section 120 as subsequent values in the first frame 130. To illustrate, the encoding engine 110 may store, in the first frame 130, a first subset of bits 144 for the first value (identified as "val(1) subset of bits" in FIG. 1), followed by a second subset of bits 146 for the second value (identified as "val(2) subset of bits" in FIG. 1). In FIG. 1, an ellipsis is used to illustrate that additional consecutive values follow the second value in the first section 120, with a final value in the first section 120 identified as "val(N)" in FIG. 1. As previously described herein, a number of values (N) for each of the frames 130-136 may correspond to sixty four (64) values (or at least 64 values), in some implementations. FIG. 1 illustrates that, for the final value (e.g., the 64th value) in the first section 120, the encoding engine 110 may store, in the first frame 130, a final subset of bits 148 for the final value (identified as "val(N) subset of bits" in FIG. 1).

Thus, FIG. 1 illustrates that the encoding engine 110 may be configured to store, in the first frame 130, the first mask value 142 that is combined with respective portions of the respective differences to generate the respective differences of each value in the first section 120. Further, the encoding engine 110 may be configured to store, in the first frame 130, the respective portions of the respective differences.

FIG. 1 illustrates that a storage engine 180 may be utilized to store the first frame 130 in a data block of a data store, according to some embodiments. In the embodiment depicted in FIG. 1, the storage engine 180 may store the first frame 130 in the data block after the encoding engine 110 has encoded the first section 120 of the input data stream 112. The storage engine 180 may sequentially store subsequent frames 132-136 in the data block after the encoding engine 110 has encoded the corresponding sections 122-126 of the input data stream 112. In alternative embodiments, the storage engine 180 may store the frames 130-136 in the data block after the encoding engine 110 has completed encoding the last section 126 of the input data stream 112 into the last frame 136.

After encoding the first section 120 of the input data stream 112, the encoding engine 110 may encode a next consecutive section of the input data stream 112 (i.e., the second section 122). To encode the second section 122 of the input data stream 112 into the second frame 130, the encoding engine 110 may be configured to identify a minimum value in the second section 122 (which may be different from the first minimum value 140 associated with the first section 120). That is, the encoding engine 110 may evaluate each value of the second subset of N values associated with the second section 122 (i.e., "val(1)" through "val(N)") of the input data stream 112 to identify the minimum value in the second section 122. The encoding engine 110 may be configured to store, in the second frame 132, the minimum value in the second section 122 as a second minimum value 150 (identified as "min value(2)" in FIG. 1).

The encoding engine 110 may be configured to determine, for each value in the second section 122, respective differences with the second minimum value 150 in the second section 122. That is, the encoding engine 110 may subtract the second minimum value 150 from each individual value of the second subset of N values associated with the second section 122, to determine individual differences from the second minimum value 150. To illustrate, for the first value in the second section 122 (i.e., "val(1)"), the encoding engine 110 may subtract the second minimum value 150 from the first value to determine a first difference associated with the first value. For the second value in the second section 122 (i.e., "val(2)"), the encoding engine 110 may subtract the second minimum value 150 from the second value to determine a second difference associated with the second value. For subsequent values in the second section 122 (i.e., values through "val(N)"), the encoding engine 110 may subtract the second minimum value 150 from each individual value to determine corresponding differences associated with each of the individual values.

The encoding engine 110 may be configured to determine, for each of the individual values in the second section 122 of the input data stream 112, a subset of bits that differ from bits of the second minimum value 150 based on the corresponding differences associated with each of the individual values. As an example, for the first value ("val(1)") in the second section 122, the first difference from the second minimum value 150 may be represented by a first set of bits. The encoding engine 110 may compare the first set of bits to bits of the second minimum value 150 to identify, for the first value, particular bits that differ from the bits of the second minimum value 150. As another example, for the second value ("val(2)") in the second section 122, the second difference from the second minimum value 150 may be represented by a second set of bits. The encoding engine 110 may compare the second set of bits to the bits of the second minimum value 150 to identify, for the second value, particular bits that differ from the bits of the second minimum value 150. In a similar manner, the encoding engine 110 may identify particular bits that differ from the bits of the second minimum value 150 for subsequent values in the second section 122, through the Nth value in the second section 122.

The encoding engine 110 may be configured to determine a mask to identify a subset of bits to be stored in the second frame 132 for each individual value in the second section 122. The encoding engine 110 may be configured to store, in the second frame 132, a second mask value 152 (identified as "mask value(2)" in FIG. 1) that is combined with respective portions of the respective differences to generate the respective differences of each value in the second section 122. The encoding engine 110 may be configured to store, in the second frame 132, the respective portions of the respective differences. In the embodiment depicted in FIG. 1, the second mask value 152 is stored as an initial value in the second frame 132, the second minimum value 150 as a next value in the second frame 132, and the subset of bits for each individual value for the second section 122 as subsequent values in the second frame 132. To illustrate, the encoding engine 110 may store, in the second frame 132, a first subset of bits 154 for the first value (identified as "val(1) subset of bits" in FIG. 1), followed by a second subset of bits 156 for the second value (identified as "val(2) subset of bits" in FIG. 1). In FIG. 1, an ellipsis is used to illustrate that additional consecutive values follow the second value in the second section 122, with a final value in the second section 122 identified as "val(N)" in FIG. 1. As previously described herein, the number of values (N) for each of the frames 130-136 may correspond to sixty four (64) values (or at least 64 values), in some implementations. FIG. 1 illustrates that, for the final value (e.g., the 64th value) in the second section 122, the encoding engine 110 may store, in the second frame 132, a final subset of bits 158 for the final value (identified as "val(N) subset of bits" in FIG. 1).

Thus, FIG. 1 illustrates that the encoding engine 110 may be configured to store, in the second frame 132, the second mask value 152 that is combined with respective portions of the respective differences to generate the respective differences of each value in the second section 122. Further, the encoding engine 110 may be configured to store, in the second frame 132, the respective portions of the respective differences.

In the embodiment depicted in FIG. 1, the storage engine 180 may store the second frame 132 after the first frame 130 in the data block after the encoding engine 110 has encoded the second section 122 of the input data stream 112. The storage engine 180 may sequentially store subsequent frames 134-136 in the data block after the encoding engine 110 has encoded the corresponding sections 124-126 of the input data stream 112. In alternative embodiments, the storage engine 180 may store the frames 130-136 in the data block after the encoding engine 110 has completed encoding the last section 126 of the input data stream 112 into the last frame 136.

After encoding the second section 122 of the input data stream 112, the encoding engine 110 may encode a next consecutive section of the input data stream 112 (i.e., the third section 124). To encode the third section 124 of the input data stream 112 into the third frame 134, the encoding engine 110 may be configured to identify a minimum value in the third section 124 (which may be different from the first minimum value 140 associated with the first section 120 and/or the second minimum value 150 associated with the second section 122). That is, the encoding engine 110 may evaluate each value of the third subset of N values associated with the third section 124 (i.e., "val(1)" through "val(N)") of the input data stream 112 to identify the minimum value in the third section 124. The encoding engine 110 may be configured to store, in the third frame 134, the minimum value in the third section 124 as a third minimum value 160 (identified as "min value(3)" in FIG. 1).

The encoding engine 110 may be configured to determine, for each value in the third section 124, respective differences with the third minimum value 160 in the third section 124. That is, the encoding engine 110 may subtract the third minimum value 160 from each individual value of the third subset of N values associated with the third section 124, to determine individual differences from the third minimum value 160. To illustrate, for the first value in the third section 124 (i.e., "val(1)"), the encoding engine 110 may subtract the third minimum value 160 from the first value to determine a first difference associated with the first value. For the second value in the third section 124 (i.e., "val(2)"), the encoding engine 110 may subtract the third minimum value 160 from the second value to determine a second difference associated with the second value. For subsequent values in the third section 124 (i.e., values through "val(N)"), the encoding engine 110 may subtract the third minimum value 160 from each individual value to determine corresponding differences associated with each of the individual values.

The encoding engine 110 may be configured to determine, for each of the individual values in the third section 124 of the input data stream 112, a subset of bits that differ from bits of the third minimum value 160 based on the corresponding differences associated with each of the individual values. As an example, for the first value ("val(1)") in the third section 124, the first difference from the third minimum value 160 may be represented by a first set of bits. The encoding engine 110 may compare the first set of bits to bits of the third minimum value 160 to identify, for the first value, particular bits that differ from the bits of the third minimum value 160. As another example, for the second value ("val(2)") in the third section 124, the second difference from the third minimum value 160 may be represented by a second set of bits. The encoding engine 110 may compare the second set of bits to the bits of the third minimum value 160 to identify, for the second value, particular bits that differ from the bits of the third minimum value 160. In a similar manner, the encoding engine 110 may identify particular bits that differ from the bits of the third minimum value 160 for subsequent values in the third section 124, through the Nth value in the third section 124.

The encoding engine 110 may be configured to determine a mask to identify a subset of bits to be stored in the third frame 134 for each individual value in the third section 124. The encoding engine 110 may be configured to store, in the third frame 134, a third mask value 162 (identified as "mask value(3)" in FIG. 1) that is combined with respective portions of the respective differences to generate the respective differences of each value in the third section 124. The encoding engine 110 may be configured to store, in the third frame 134, the respective portions of the respective differences. In the embodiment depicted in FIG. 1, the third mask value 162 is stored as an initial value in the third frame 134, the third minimum value 160 as a next value in the third frame 134, and the subset of bits for each individual value for the third section 124 as subsequent values in the third frame 134. To illustrate, the encoding engine 110 may store, in the third frame 134, a first subset of bits 164 for the first value (identified as "val(1) subset of bits" in FIG. 1), followed by a second subset of bits 166 for the second value (identified as "val(2) subset of bits" in FIG. 1). In FIG. 1, an ellipsis is used to illustrate that additional consecutive values follow the second value in the third section 124, with a final value in the third section 124 identified as "val(N)" in FIG. 1. As previously described herein, the number of values (N) for each of the frames 130-136 may correspond to sixty four (64) values (or at least 64 values), in some implementations. FIG. 1 illustrates that, for the final value (e.g., the 64th value) in the third section 124, the encoding engine 110 may store, in the third frame 134, a final subset of bits 168 for the final value (identified as "val(N) subset of bits" in FIG. 1).

Thus, FIG. 1 illustrates that the encoding engine 110 may be configured to store, in the third frame 134, the third mask value 162 that is combined with respective portions of the respective differences to generate the respective differences of each value in the third section 124. Further, the encoding engine 110 may be configured to store, in the third frame 134, the respective portions of the respective differences.

In the embodiment depicted in FIG. 1, the storage engine 180 may store the third frame 134 after the second frame 132 in the data block after the encoding engine 110 has encoded the third section 124 of the input data stream 112. The storage engine 180 may sequentially store subsequent frames in the data block after the encoding engine 110 has encoded the corresponding sections of the input data stream 112. In alternative embodiments, the storage engine 180 may store the frames 130-136 in the data block after the encoding engine 110 has completed encoding the last section 126 of the input data stream 112 into the last frame 136.

After encoding the third section 124 of the input data stream 112, the encoding engine 110 may encode the next consecutive sections of the input data stream 112 through the last section 126. To encode the last section 126 of the input data stream 112 into the last frame 136, the encoding engine 110 may be configured to identify a minimum value in the last section 126 (which may be different from one or more of the first minimum value 140 associated with the first section 120, the second minimum value 150 associated with the second section 122, or the third minimum value 160 associated with the third section 124). That is, the encoding engine 110 may evaluate each value of the Nth subset of N values associated with the last section 126 (i.e., "val(1)" through "val(N)") of the input data stream 112 to identify the minimum value in the last section 126. The encoding engine 110 may be configured to store, in the last frame 136, the minimum value in the last section 126 as a last minimum value 170 (identified as "min value(x)" in FIG. 1).

The encoding engine 110 may be configured to determine, for each value in the last section 126, respective differences with the last minimum value 170 in the last section 126. That is, the encoding engine 110 may subtract the last minimum value 170 from each individual value of the last subset of N values associated with the last section 126, to determine individual differences from the last minimum value 170. To illustrate, for the first value in the last section 126 (i.e., "val(1)"), the encoding engine 110 may subtract the last minimum value 170 from the first value to determine a first difference associated with the first value. For the second value in the last section 126 (i.e., "val(2)"), the encoding engine 110 may subtract the last minimum value 170 from the second value to determine a second difference associated with the second value. For subsequent values in the last section 126 (i.e., values through "val(N)"), the encoding engine 110 may subtract the last minimum value 170 from each individual value to determine corresponding differences associated with each of the individual values.

The encoding engine 110 may be configured to determine, for each of the individual values in the last section 126 of the input data stream 112, a subset of bits that differ from bits of the last minimum value 170 based on the corresponding differences associated with each of the individual values. As an example, for the first value ("val(1)") in the last section 126, the first difference from the last minimum value 170 may be represented by a first set of bits. The encoding engine 110 may compare the first set of bits to bits of the last minimum value 170 to identify, for the first value, particular bits that differ from the bits of the last minimum value 170. As another example, for the second value ("val(2)") in the last section 126, the second difference from the last minimum value 170 may be represented by a second set of bits. The encoding engine 110 may compare the second set of bits to the bits of the last minimum value 170 to identify, for the second value, particular bits that differ from the bits of the last minimum value 170. In a similar manner, the encoding engine 110 may identify particular bits that differ from the bits of the last minimum value 170 for subsequent values in the last section 126, through the Nth value in the last section 126.

The encoding engine 110 may be configured to determine a mask to identify a subset of bits to be stored in the last frame 136 for each individual value in the last section 126. The encoding engine 110 may be configured to store, in the last frame 136, a last mask value 172 (identified as "mask value(x)" in FIG. 1) that is combined with respective portions of the respective differences to generate the respective differences of each value in the last section 126. The encoding engine 110 may be configured to store, in the last frame 136, the respective portions of the respective differences. In the embodiment depicted in FIG. 1, the last mask value 172 is stored as an initial value in the last frame 136, the last minimum value 170 as a next value in the last frame 136, and the subset of bits for each individual value for the last section 126 as subsequent values in the last frame 136. To illustrate, the encoding engine 110 may store, in the last frame 136, a first subset of bits 174 for the first value (identified as "val(1) subset of bits" in FIG. 1), followed by a second subset of bits 176 for the second value (identified as "val(2) subset of bits" in FIG. 1). In FIG. 1, an ellipsis is used to illustrate that additional consecutive values follow the second value in the last section 126, with a final value in the last section 126 identified as "val(N)" in FIG. 1. As previously described herein, the number of values (N) for each of the frames 130-136 may correspond to sixty four (64) values (or at least 64 values), in some implementations. FIG. 1 illustrates that, for the final value (e.g., the 64th value) in the last section 126, the encoding engine 110 may store, in the last frame 136, a last subset of bits 178 for the final value (identified as "val(N) subset of bits" in FIG. 1).

Thus, FIG. 1 illustrates that the encoding engine 110 may be configured to store, in the last frame 136, the last mask value 172 that is combined with respective portions of the respective differences to generate the respective differences of each value in the last section 126. Further, the encoding engine 110 may be configured to store, in the last frame 136, the respective portions of the respective differences.

The following portion of the specification begins with a general description of a provider network that implements database services (or other data storage or processing services) that may implement using computer resources to perform database queries and implement an encoding engine according to the present disclosure for compression of numeric-like data types. Then various examples of one such database service, including different components/modules, or arrangements of components/module that may be employed as part of implementing the techniques are discussed. A number of different methods and techniques to implement an encoding scheme for compressing numeric-like data types, some of which are illustrated in accompanying flowcharts, are then discussed. Afterwards, a description of an example computing system upon which the various components, modules, systems, devices, and/or nodes may be implemented is provided. Various examples are provided throughout the specification.

Figure 2:
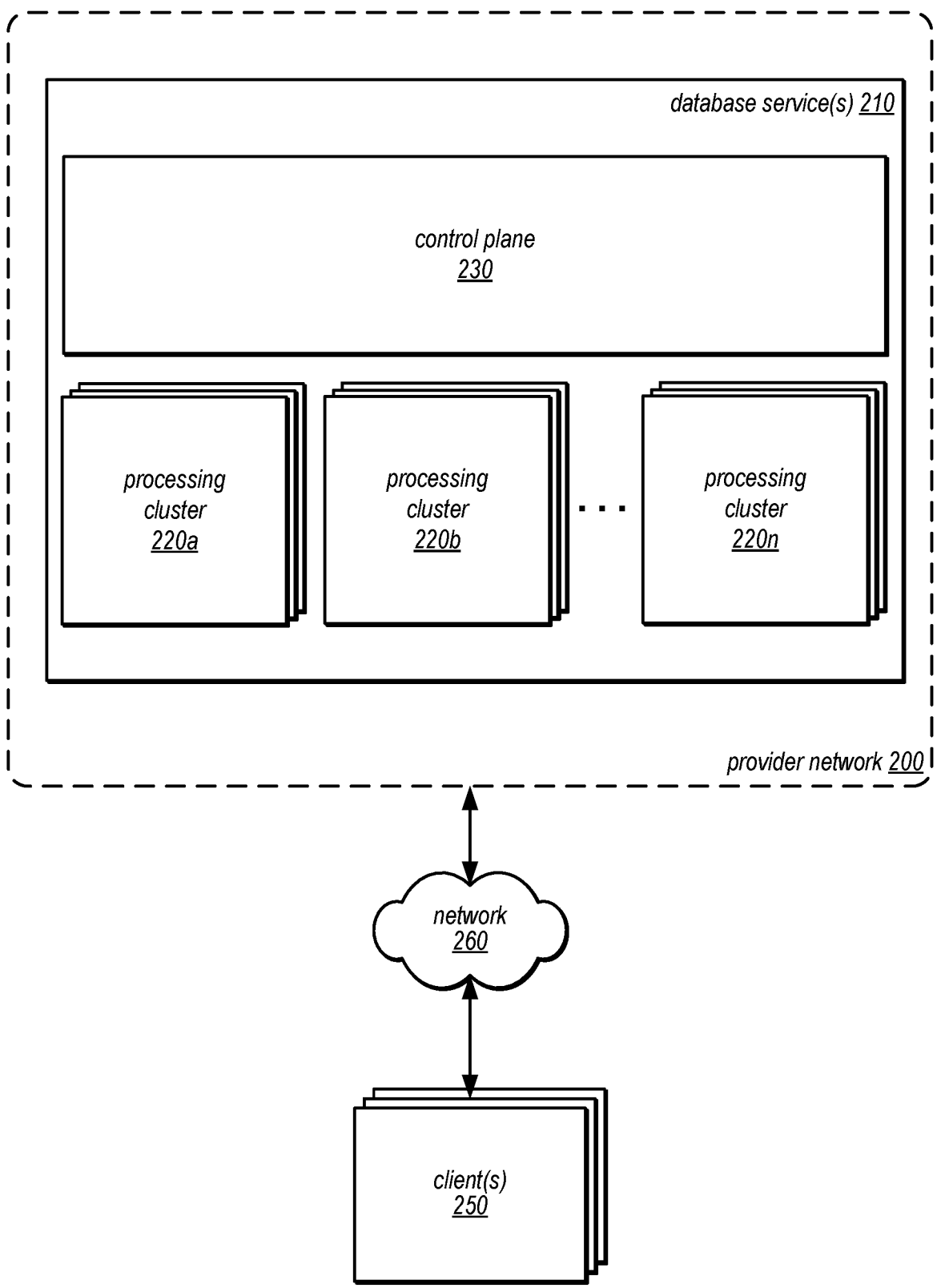
FIG. 2 is a logical block diagram illustrating a provider network offering a database service that provides an encoding engine for compressing numeric-like data types for storage in databases hosted in the database service, according to some embodiments.

FIG. 2 is a logical block diagram illustrating a provider network offering a database service that provides an encoding engine for compressing numeric-like data types for storage in databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios, a data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

As described further herein, the compression method of the present disclosure may be utilized in cases where the particular columnar data type corresponds to a numeric-like data type. The types that are supported by the encoding scheme of the present disclosure are: smallint (16-bit); integer (32-bit); bigint (64-bit); numeric/decimal (64-bit & 128-bit); date (32-bit); and timestamp[tz] (64-bit). The types not supported by the encoding scheme of the present disclosure are: bool; char; varchar; float4 (C++ float); and float (C++ double).

Database service 210 may be implemented by a large collection of computing devices, such as customized or off-the-shelf computing systems, servers, or any other combination of computing systems or devices, such as the various types of systems 2000 described below with regard to FIG. 8, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
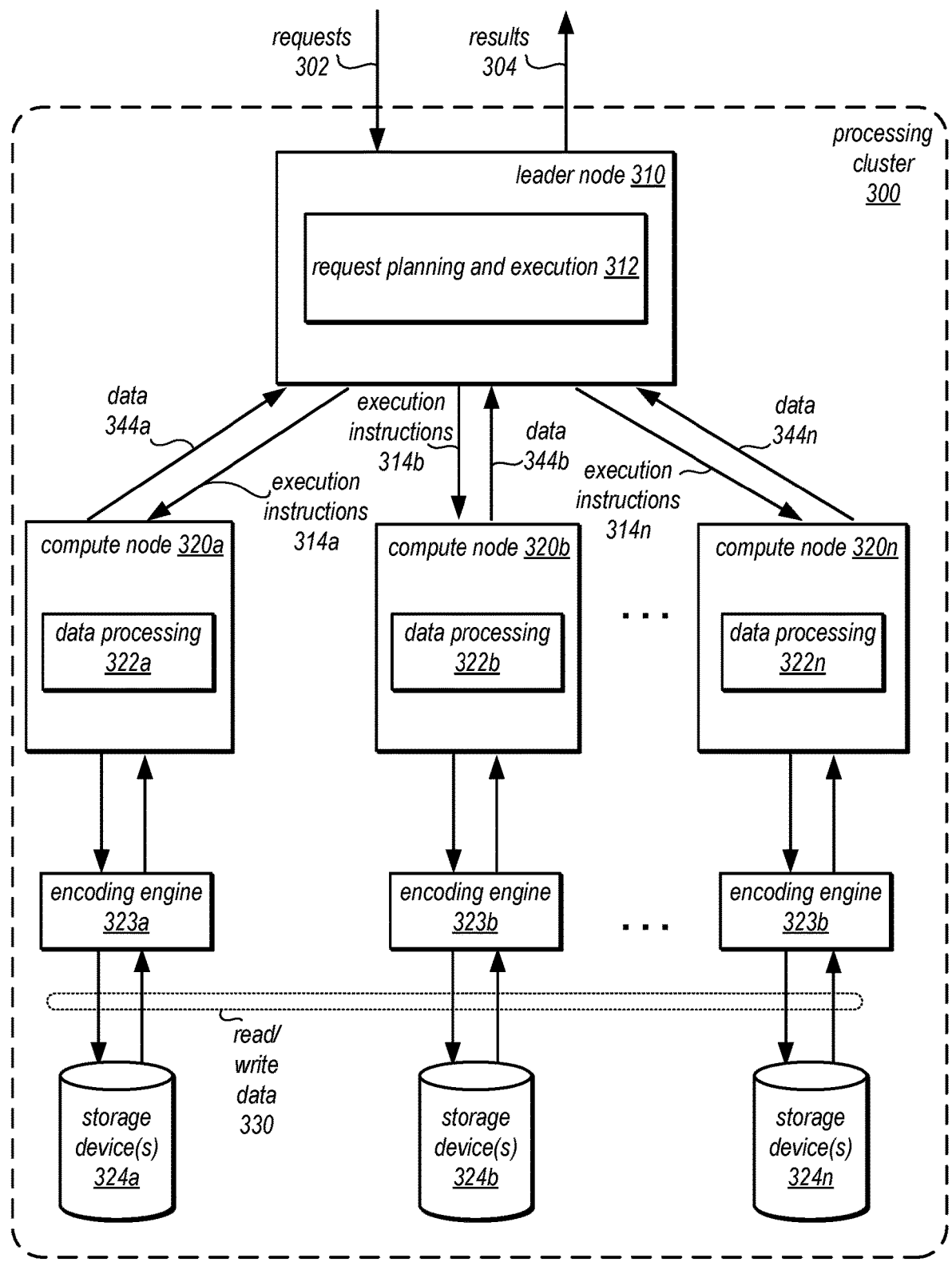
FIG. 3 is a logical block diagram illustrating a processing cluster of a database service that implements an encoding engine for compressing numeric-like data types and a decoding engine for decoding the compressed data, according to some embodiments.

FIG. 3 is a logical block diagram illustrating a processing cluster of a database service that implements an encoding scheme for compressing numeric-like data types for storage and a decoding engine for decoding the compressed data, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment.

Leader node 310 may implement metric planning history/performance metric collection (not illustrated) to collect and report performance metrics collected for various events, units of work, or other portions a query or other operation's performance, compute node or leader node performance, and history of operations performed, in some embodiments.

As described herein, each node in a processing cluster 300 may include attached storage, such as storage device(s) 324a, 324b, and 324n, on which a database, including tables may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 2000 in FIG. 8, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment.

Data processing 322 may access a certain memory and disk space in order to process a portion of the workload for a request that is sent to one or more of the compute nodes 320. Data processing 322 may access attached storage, such as 324a, 324b, and 324n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

FIG. 3 illustrates that the processing cluster 300 may include encoding engine(s), such as encoding engines 323a, 323b, and 323n for compressing numeric-like data types according to the encoding scheme of the present disclosure. As further described herein, the encoding engine(s), such as encoding engines 323a, 323b, and 323n may also be utilized for decompressing numeric-like data types that are compressed according to the encoding scheme of the present disclosure. In the embodiment depicted in FIG. 3, the encoding engines 323a, 323b, and 323n are illustrated as separate from other features of the processing cluster 300. In the alternative, the encoding engines 323a, 323b, and 323n may be located with other features, such as with the data processing 322 of the compute nodes 322a, 322b, and 322n (among other possibilities).

Figure 4:
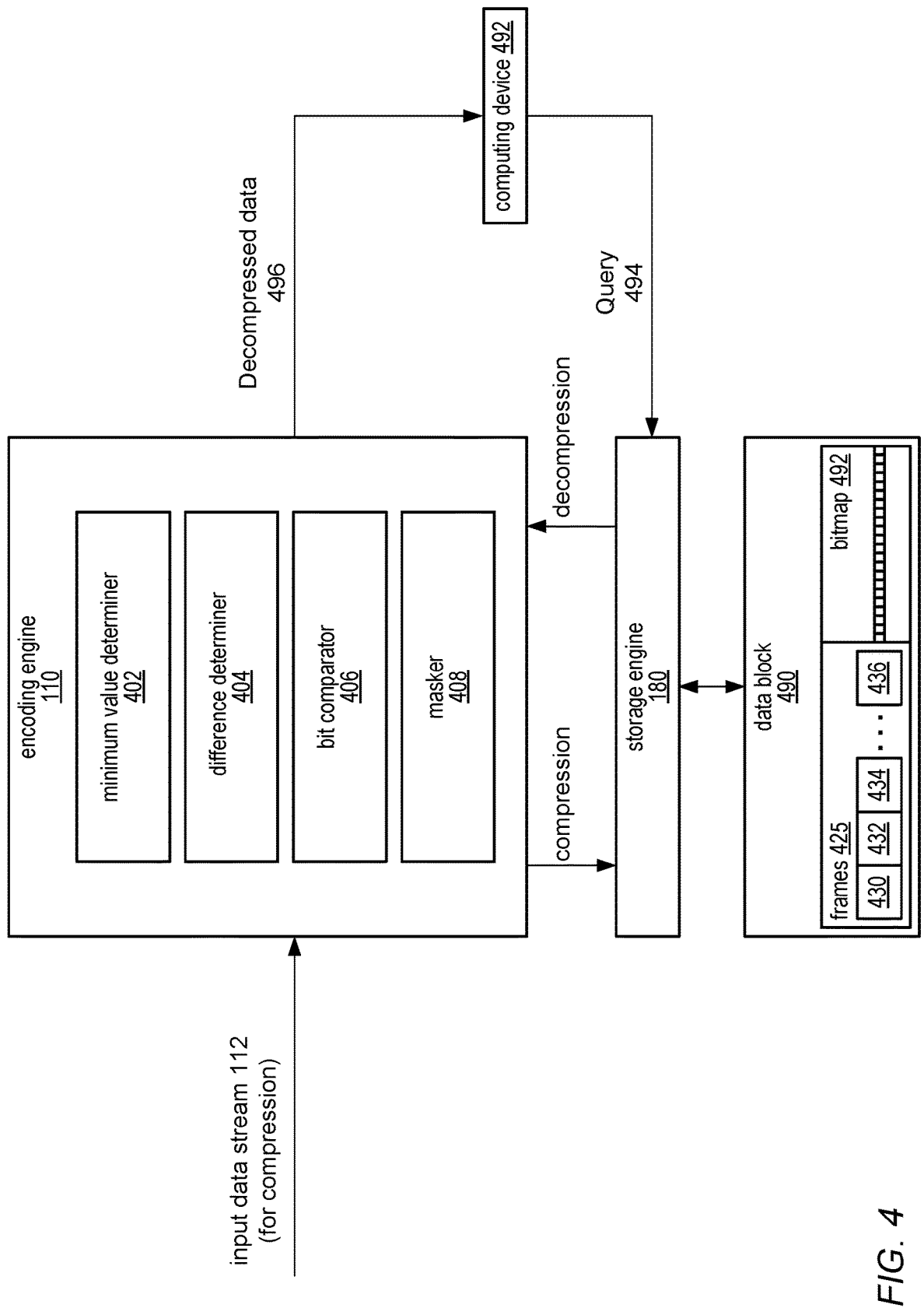
FIG. 4 is a logical block diagram illustrating details of an encoding engine for compressing numeric-like data types, according to some embodiments.

FIG. 4 is a logical block diagram illustrating details of an encoding engine for compressing numeric-like data types, according to some embodiments.

In FIG. 4, the encoding engine 110 (which may correspond to the encoding engine 110 depicted in FIG. 1) includes a minimum value determiner 402, a difference determiner 404, a bit comparator 406, and a masker 408. FIG. 4 illustrates that the encoding engine 110 may be utilized for compression as well as decompression.

In the case of compression, the encoding engine 110 may receive the input data stream 112 that includes a stream of values. As previously described herein with respect to FIG. 1, the encoding engine 110 may be configured to encode consecutive sections of the input data stream 112 into respective frames. The stream of values may include a relatively large number of values, and the encoding engine 110 may be configured to encode a relatively small subset of the values (representing a "section" of the input data stream) into each individual frame. To illustrate, each section of the input data stream 112 may include a particular number (N) of values, which may be a predetermined fixed number of values for a particular encoding scheme. For example, the particular number (N) of values may correspond to sixty four (64) values, in some implementations.

The minimum value determiner 402 of the encoding engine 110 may be configured to identify a particular minimum value associated with a particular consecutive section of the input data stream 112. For example, the minimum value determiner 402 may evaluate each value of a particular subset of N values associated with the particular section (e.g., 64 values) of the input data stream 112 to identify the minimum value in the particular section. The minimum value determiner 402 may be configured to provide the determined minimum value to the difference determiner 404.

The difference determiner 404 of the encoding engine 110 may be configured to determine, for each value in the particular section, respective differences with the minimum value in the particular section. That is, the difference determiner 404 may subtract the minimum value determined by the minimum value determiner 402 from each individual value of the particular subset of N values associated with the particular section of the input data stream 112, to determine individual differences from the minimum value (e.g., by subtracting each of values from the minimum value). The difference determiner 404 may be configured to provide the individual differences to the bit comparator 406.

The bit comparator 406 of the encoding engine 110 may be configured to determine, for each of the individual values in the particular section of the input data stream 112, a subset of bits that differ from bits of the minimum value based on the corresponding differences associated with each of the individual values. As an example, for a particular value in the particular section of the input data stream 112, a difference from the minimum value may be represented by a set of bits. The bit comparator 406 of the encoding engine 110 may be configured to compare the set of bits to bits of the minimum value to identify, for the particular value, particular bits that differ from the bits of the minimum value. The bit comparator 406 may be configured to provide, for each value in the particular section of the input data stream 112, the subsets of bits that differ from bits of the minimum value.

The masker 408 may be configured to determine a mask to identify a particular subset of bits to be stored in a particular frame for each individual value in the particular section. The masker 408 of the encoding engine 110 may be configured to store, in a particular frame, a mask value that is combined with respective portions of the respective differences to generate the respective differences of each value in the particular section.

FIG. 4 further illustrates that a storage engine 180 may be utilized to store frames 425 in a data block 490, according to some embodiments. In some embodiments, the storage engine 180 may store a first frame 430 in the data block 490 after the encoding engine 110 has encoded a first section of the input data stream 112. The storage engine 180 may sequentially store subsequent frames 432-436 in the data block 490 after the encoding engine 110 has encoded the corresponding sections of the input data stream 112. In alternative embodiments, the storage engine 180 may store the frames 430-436 in the data block 490 after the encoding engine 110 has completed encoding a last section of the input data stream 112 into a last frame 436.

FIG. 4 illustrates a particular embodiment in which the data block 490 includes a separate bitmap 492. As described further herein with respect to FIG. 5, in cases where the input data stream 112 includes both null and non-null values, the bitmap 492 may be utilized to store a single bit for each tuple denoting if it is null or non-null.

FIG. 4 further illustrates that the encoding engine 110 may be configured to decompress data stored in the data block 490. For example, a computing device 492 may generate a query 494, and the storage engine 180 may signal the encoding engine 110 to initiate decompression of corresponding data that is encoded in one or more of the frames 425 in the data block 490. After decompression, the encoding engine 110 may provide decompressed data 496 to the computing device 492 responsive to the query 494.

Limited performance testing was performed, and the following results represent measurements of the efficiency of the encoding scheme described herein using a 3 TB dataset as a benchmark. The frame size was set to 64 values per frame for the encoding. For comparison, the following results represent the number of blocks needed for all integer-numeric columns in all tables of the dataset: RAW=1,366,267 blocks; LZO=637,779 blocks; and ZSTD=441,003 blocks. With the encoding scheme of the present disclosure (with N=64), the number of blocks needed for all integer-numeric columns in all tables of the dataset was determined to be 412,234 blocks. In terms of query performance, every char and varchar was stored as either BYTEDICT or ZSTD, and performance was measured for 22 benchmark queries. The results are: RAW=627.5 seconds; LZO=692.4 seconds; and ZSTD=851.3 seconds. With the encoding scheme of the present disclosure (with N=64) the result was 505.7 seconds.

In summary, the results of the limited performance testing indicated that the encoding scheme of the present disclosure surpassed all compression types in terms of size. In terms of efficiency, the encoding scheme of the present disclosure was roughly 20 percent faster than RAW (uncompressed) data, roughly 30 percent faster than LZO, and roughly 70 percent faster than ZSTD, which achieved the closest compression ratio.

In the best case, when the frame size is set to 64 values per frame for the encoding scheme of the present disclosure, the encoding scheme encodes each value using 2 bits per value. In the worst case, the encoding scheme stores 2 additional values per 64 values. If a column is specified as not null, the encoding scheme stores 64+2 per 64 values. Thus, the overhead is (66−64)/64=1/32=3.125 percent compared to RAW.

The following discussion relates to the rationale behind the encoding scheme of the present disclosure. Frame-of-reference (FOR) encoding is common in analytical databases. The most common usage of frame-of-reference is to encode a whole page of tuples by using a max/min frame where a page has thousands of tuples. However, outliers can damage the compression by causing the frame to use more bits than necessary per value. The extra bits are used by only a few outlier values but will affect every value in the page. One solution is to store outlier values separately and provide a way to put the outlier values back in order with the rest of the encoded stream. This encoding and its variants are known as patched frame-of-reference (PFOR).

One problem associated with PFOR is that it needs to maintain at least two streams of data, one for regular encoded values and one for exceptions. This can be difficult if the streams are large since the block is filled up on-the-fly. Even bi-directional methods do not work because the right side of the block is used to store nulls for nullable columns. Another more important problem associated with PFOR is that it assumes there is a fast way to detect outliers while compressing/encoding new data. However, this is a difficult task, and there is no single well-specified way to detect such outliers quickly, in addition to the overhead in compression/encoding speed it would entail.

Accordingly, instead of encoding pages, the present disclosure encodes small blocks of N tuples (e.g., where N≥64) without handling outliers in any special way. The reasoning is that even if outliers exist, in the case where N=64, such outliers would affect the compression of up to 63 tuples around them but not the entire page of tuples. Furthermore, if there are no outliers, PFOR still needs to store masks or index arrays to re-attach them. In the encoding scheme of the present disclosure, encoding is significantly simpler since the algorithm does not need to detect outliers at all.

The reasoning behind choosing 64 tuples per frame relies on multiple non-trivial facts. First, every frame is stored using 64*N bits, meaning encoding/decoding can be done by loading/storing the input in N 64-bit words. Second, 64 tuples is the optimal case for off-by-1 frames for both 32-bit and 64-bit data. For example, if the input is sorted and each value is +1 from the previous value, the number of bits is optimal for both 32-bit and 64-bit inputs. Using windows of 32 tuples would be optimal for 16-bit and 32-bit data but would use more space for 64-bit and 128-bit data. Using windows of 128 tuples would be optimal for 64-bit and 128-bit cases but 128-bit data is less common than 32-bit data and the cost of the outliers is higher.

Another reason for choosing 64 tuples per frame is that it limits the worst case compared to RAW to a small enough number (~3%) for the frames that are uncompressed. The three percent is small enough to be acceptable and the frame size is small enough to accommodate outliers without affecting a very large number of tuples.

One advantage of selecting 64 for the number of values per frame is the potential for reduced storage space in cases where numeric values are substantially sequential (but not necessarily sorted). To illustrate, the numeric values may correspond to X, X+1, X+2, etc., but the numeric values are not necessarily sorted. That is, the encoding scheme of the present disclosure does not require the 64 values to be sorted prior to compression to reduce storage space. Another advantage of selecting 64 (or at least 64) for the number of values per frame is related to data-parallelism. For data-parallel delta encoding, 64 is the minimum size that allows for data-parallel delta encoding decompression. To illustrate, if delta encoding were performed for every two values (N=2), there would be no data-parallelism because there are dependencies between every two values. By contrast, with 64 values, there is no such dependency between values, allowing for substantially improved decompression rates. Another advantage of selecting 64 for the number of values per frame is that regardless of the number of bits required to store the data, 64-bit extraction may be utilized as this is what modern CPUs support to compress or decompress data.

Further, in the encoding scheme of the present disclosure, the bits within each frame are packed horizontally. This allows for a fast and easy scalar implementation of both encoding and decoding and an even faster vectorized implementation of decoding.

The rationale behind using the special RLE for the null bitmap is simple. If the bits are repeated either because the column has almost all nulls or no nulls, this avoids storing repeating 0 or 1 bits by using RLE to encode repeated words. However, if nulls occur at a rate that is more frequent than 1 bitmap per word, then storing the bitmap literally would require less space. Expecting bitmap words that are not all 0 bits or all 1 bits to repeat verbatim is unrealistic hence there is no reason to utilize an extra byte. Storing more than 1 byte for RLE is also unrealistic because even if all the values in a block, more than $2^\wedge-1$ tuples cannot be stored in each block. With N set to 64 values per frame, the encoding scheme of the present disclosure stores up to 1,908,670,464 null values in each 1 MB block.

Similarly, the RLE for data frames follows the same principle. Default values can be compressed much more effectively. The maximum number of values per block depends on the data size. Each maxed-out RLE frame requires (sizeof(T)*2+1) bytes to store 64*256=16384. The smallest data type supported in the encoding/compression scheme of the present disclosure is 16-bit integer which requires 5 bytes per frame to store 16384 repeated values. In such a case, the encoding/compression scheme of the present disclosure stores up to 3,435,626,496 repeated 16-bit values in each 1 MB block, which is still smaller than the 2^1 limit.

Figure 5:
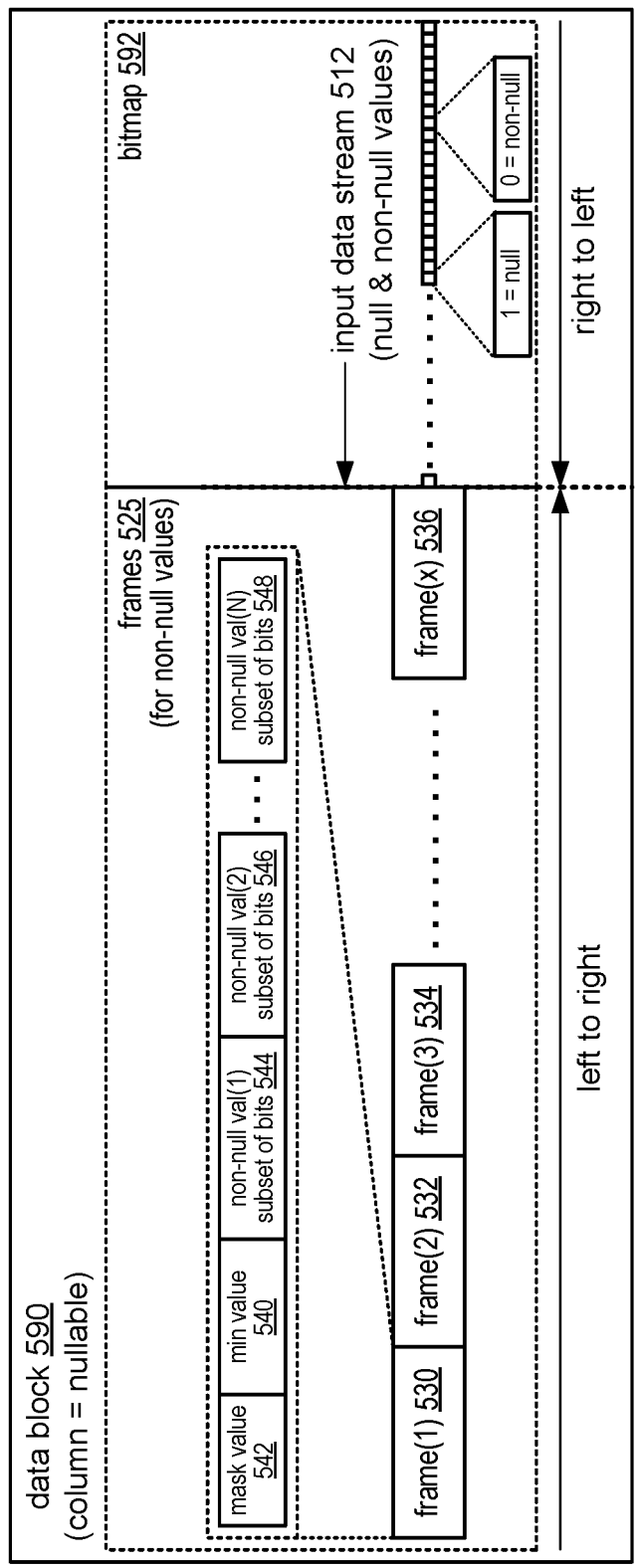
FIG. 5 is a diagram illustrating a data block that includes frames of non-null values and a null bitmap identifying individual values of an input data stream as null or non-null, according to some embodiments.

FIG. 5 is a diagram illustrating a data block that includes frames of non-null values and a null bitmap identifying individual values of an input data stream as null or non-null, according to some embodiments.

FIG. 5 depicts an example of a data block 590 of a data store. FIG. 5 illustrates that, in cases where a column is nullable, the encoding scheme of the present disclosure may store null values in a separate bitmap 592 at the end of the data block 590. FIG. 5 illustrates that an input data stream (e.g., the input data stream 112 depicted in FIGS. 1 and 4) may include both null and non-null values, and the bitmap 592 may store a single bit for each tuple denoting if it is null or non-null (with FIG. 5 illustrating an example where a 0 bit represents a non-null value and a 1 bit represents a null value). FIG. 5 further illustrates that the bitmap (64-bit) words are stored in reverse order in the data block 590 (e.g., from "right to left") but the bits within each word are stored in the regular low to high significant order. In the example depicted in FIG. 5, the "left" side of the data block 590 stores only the non-null values in the input data stream. The storing of an encoded version of a particular section and the storing of the bitmap 592 may be performed in parallel. That is, the bits in the bitmap 592 may be ordered consecutively, from "right to left" in the data block 590, in the same order as the values in a stream of values. To illustrate, a first bit written in the bitmap 592 may identify a first value in the stream of values by either a 1 bit or a 0 bit depending on whether the first value is a null value or a non-null value. A second bit written in the bitmap 592 (to the "left" of the first bit in the data block 590) may identify a second value following the first value in the stream of values by either a 1 bit or a 0 bit depending on whether the second value is a null value or a non-null value. Bits may continue to be added to the bitmap 592 (to the "left" of the preceding bits in the data block 590) for each successive value in the stream of values.

Referring to the "left" side of the data block 590 of FIG. 5, multiple frames 525 (for non-null values in the input data stream 512) are illustrated. Similar to FIGS. 1 and 4, the multiple frames 525 each correspond to particular sections in an input data stream (e.g., the input data stream 112 depicted in FIGS. 1 and 4). For illustrative purposes, the multiple frames 525 depicted in FIG. 5 include a first frame 530, a second frame 532, a third frame 534, continuing to a last frame 536 (identified as "frame(x)" in FIG. 5). FIG. 5 depicts a detailed view of the first frame 530, illustrating that a mask value 542 represents an initial value, followed by a minimum value 540, followed by bit subsets for N (e.g., 64) values. In the example of FIG. 5, where only non-null values are stored in the frames 525, a first subset of bits 544 is associated with a first non-null value in the input data stream 512, a second subset of bits 546 is associated with a second non-null value in the input data stream 512, through a Nth subset of bits 548 associated with an Nth (e.g., 64th) non-null value in the input data stream 512. In some cases, the process of adding data to the data block 590 may occur at different times, with intermittent stops between sets of values being added. As an illustrative, non-limiting example, numerous values in a data stream may be added to the data block 590, and the addition of more values to the data block 590 may stop for a period of time before more values are added to the data block 590. As the values in the data stream are being written in the same order in the data block 590, the encoding scheme is unaffected by such intermittency.

The bitmap 592 may be compressed using run-length-encoding (RLE). Specifically, if the bits in a 64-bit word are all 0 or all 1, then one additional byte may be stored denoting the number of additional repeats for the word. The extra RLE byte takes values in [0, 255] denoting [1, 256] repetitions (including the first one) of the last 64-bit word. If there are both 0 and 1 bits in the last bitmap word, then there is no tail byte and no repetition of the word. If the bitmap 592 has no nulls, this effectively stores the null bits for 16,384 tuples using 9 bytes. Similarly, if the bitmap 592 has only nulls, it is possible to store almost 2 billion nulls in a single 1 MB block.

Figure 6:
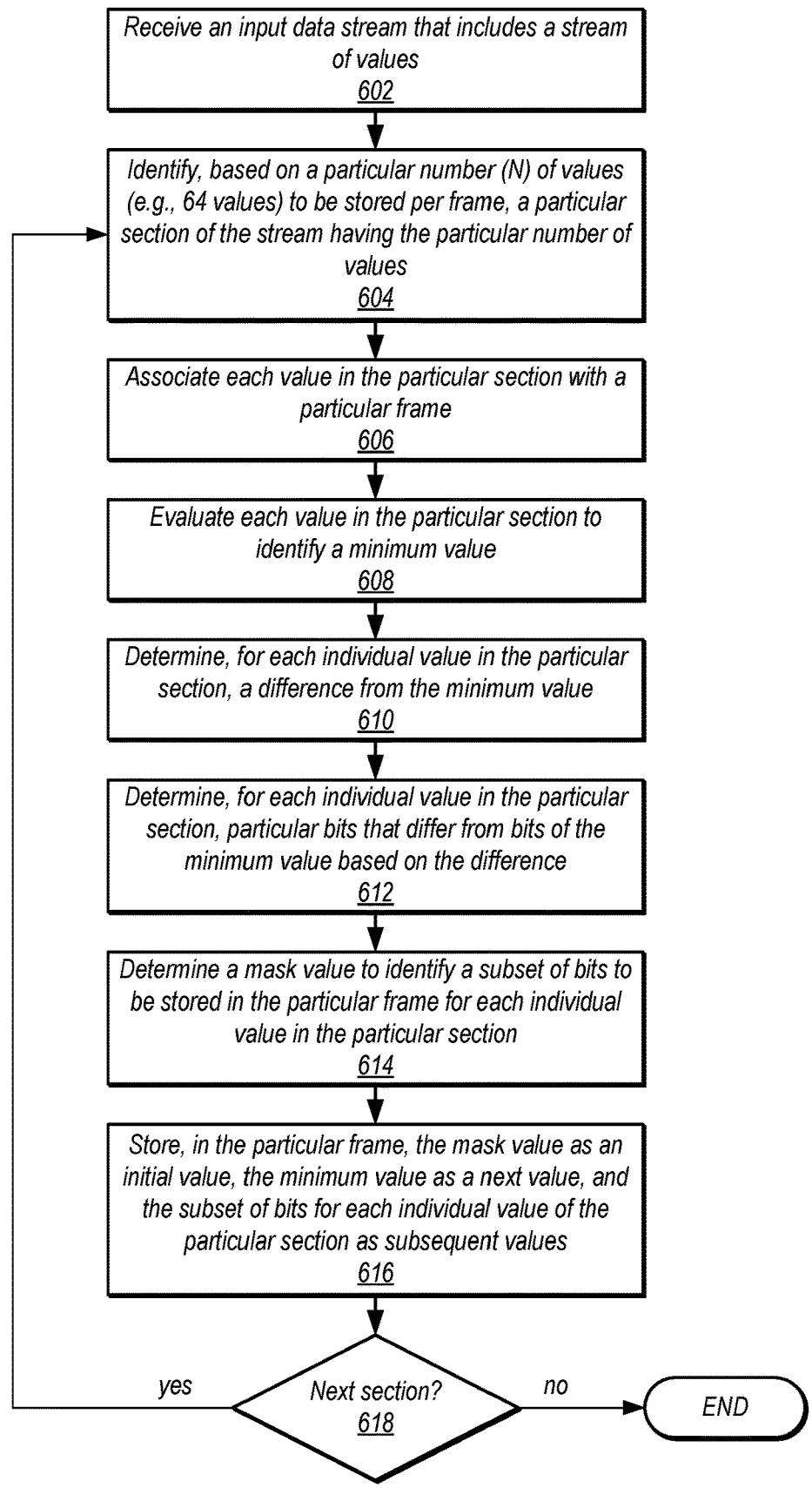
FIG. 6 is a high-level flowchart illustrating methods and techniques to utilize an encoding scheme to compress numeric-like data types, according to some embodiments.

FIG. 6 is a high-level flowchart illustrating methods and techniques to compress numeric-like data types, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or configurations of systems and devices.

As indicated at 602, an input data stream that includes a stream of values may be received, in various embodiments. For example, referring to FIG. 1, the input data stream 112 may include a stream of values having a numeric-like data type. Examples of numeric-like data types include: smallint (16-bit); integer (32-bit); bigint (64-bit); numeric/decimal (64-bit & 128-bit); date (32-bit); and timestamp[tz] (64-bit). The types that are not supported by the encoding scheme include: bool; char; varchar; float4 (C++ float); and float8 (C++ double).

As indicated at 604, based on a particular number (N) of values to be stored per frame, a particular section of the stream having the particular number of values may be identified, in various embodiments. In some embodiments, the particular number (N) of values corresponds to 64 values to be stored per frame. For example, referring to FIG. 1, the encoding engine 110 may identify the first section 120 of the input data stream 112 having N values (represented as "val(1)" through "val(N)" in FIG. 1). As previously described herein, an N that is greater than or equal to 64 is large enough to be vectorizable and relaxes data dependencies which allows for data-parallel delta encoding.

As indicated at 606, each value of the particular section of the stream may be associated with a particular frame, in various embodiments. For example, referring to FIG. 1, the encoding engine 110 may associate each of the values of the first section 120 of the input data stream 112 with the first frame 130.

As indicated at 608, each value in the particular section of the stream may be evaluated to identify a minimum value, in various embodiments. For example, referring to FIG. 1, the encoding engine 110 may evaluate each of the N values in the first section 120 (depicted as "val(1)" through "val (N)" in FIG. 1) of the input data stream 112 to identify the first minimum value 140 (identified as "min value(1)" in FIG. 1) as the minimum value in the first section 120 of the input data stream 120.

As indicated at 610, a difference from the minimum value may be determined for each individual value in the particular section, in various embodiments. For example, referring to FIG. 1, the encoding engine 110 may be configured to determine, for each value in the first section 120, respective differences with the first minimum value 140. To illustrate, for the first value in the first section 120 (i.e., "val(1)"), the encoding engine 110 may subtract the first minimum value 140 from the first value to determine a first difference associated with the first value. For the second value in the first section 120 (i.e., "val(2)"), the encoding engine 110 may subtract the first minimum value 140 from the second value to determine a second difference associated with the second value. For subsequent values in the first section 120 (i.e., values through "val(N)"), the encoding engine 110 may subtract the first minimum value 140 from each individual value to determine corresponding differences associated with each of the individual values.

As indicated at 612, for each individual value in the particular section, a particular bits that differ from bits of the minimum value may be determined based on the difference, in various embodiments. For example, referring to FIG. 1, for the first value ("val(1)") in the first section 120, the first difference from the first minimum value 140 may be represented by a first set of bits. The encoding engine 110 may compare the first set of bits to bits of the first minimum value 140 to identify particular bits for the first value that differ from the bits of the first minimum value 140. For the second value ("val(2)") in the first section 120, the second difference from the first minimum value 140 may be represented by a second set of bits. The encoding engine 110 may compare the second set of bits to bits of the first minimum value 140 to identify particular bits for the second value that differ from the bits of the first minimum value 140. For subsequent values in the first section 120 (i.e., values through "val(N)"), the encoding engine 110 may compare corresponding sets of bits to bits of the first minimum value 140 to identify particular bits for the corresponding values that differ from the bits of the first minimum value 140.

As indicated at 614, a mask value to identify the subset of bits to be stored in the particular frame for each individual value in the particular section may be determined, in various embodiments. For example, referring to FIG. 1, the encoding engine 110 may determine the first mask value 142 to identify the subset of bits to be stored for each individual value in the first section 120 (e.g., val(1) through val(N), where N may be 64).

As indicated at 616, the mask value, the minimum value, and the subset of bits for each individual value of the particular section may be stored in the particular frame, in various embodiments. In some embodiments, the mask value may be stored as an initial value in the particular frame, the minimum value may be stored as a next value in the particular frame, and the subset of bits for each individual value may be stored as subsequent values in the particular frame. For example, referring to FIG. 1, the encoding engine 110 may store, in the first frame 130, the first mask value 142, the first minimum value 140, and the corresponding subsets of bits 144-146 for each individual value of the first section 120 (e.g., corresponding subsets of bits for val(1) through val(N), where N may be 64). FIG. 1 illustrates a particular embodiment in which the first mask value 142 is stored as the initial value in the first frame 130, the first minimum value 140 is stored as the next value in the first frame 130, and the subsets of bits 144-146 for each individual value in the first section 120 are stored as subsequent values in the first frame 130.

FIG. 6 illustrates that the technique may be repeated if the input data stream includes additional sections, as indicated by the positive exit from 618, in some embodiments. For example, referring to FIG. 1, the technique may be repeated for the second section 122 of the input data stream 112, for the third section 124 of the input data stream 112, through the final section 126 of the input data stream 112.

Figure 7:
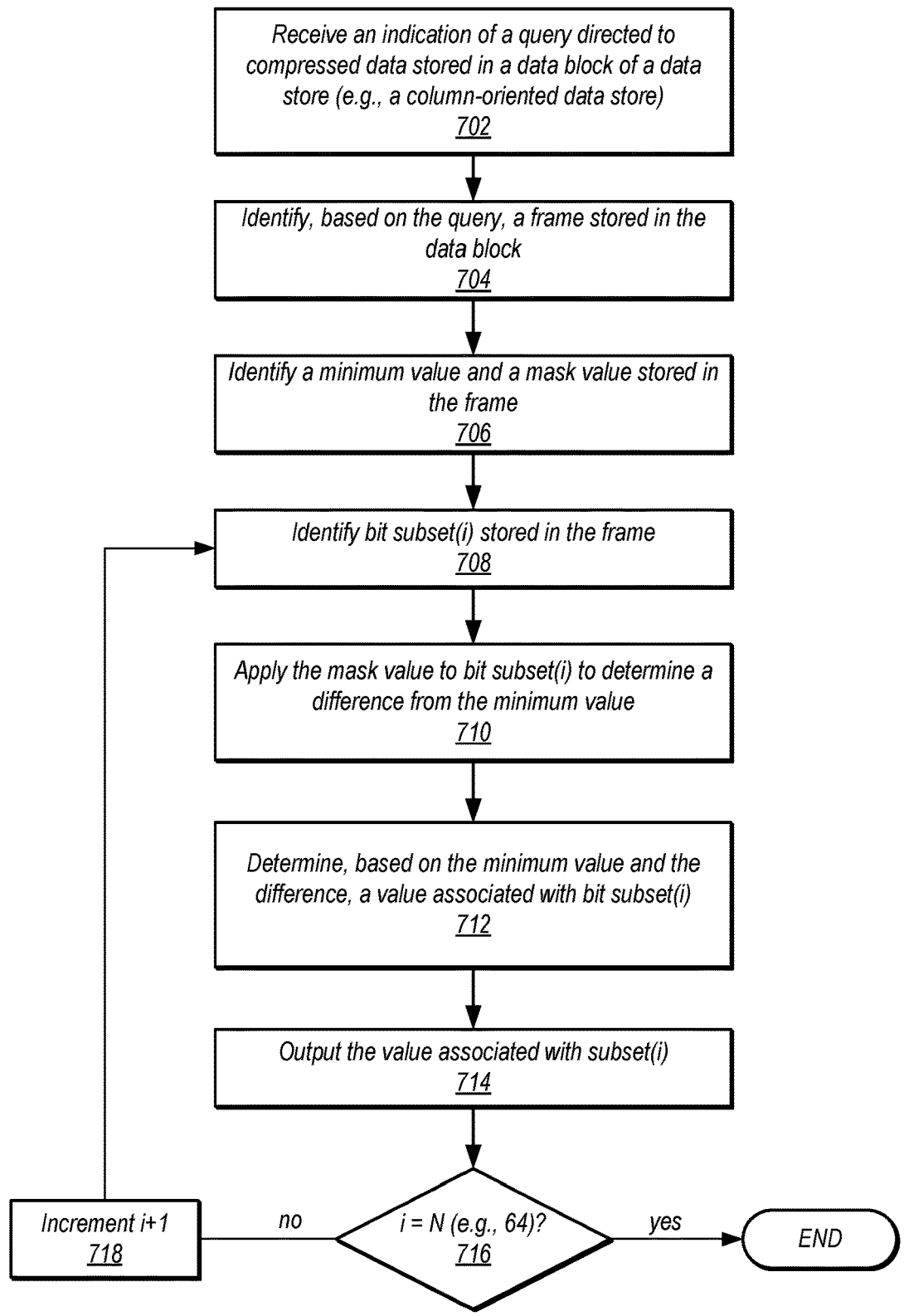
FIG. 7 is a high-level flowchart illustrating methods and techniques to decompress data that is stored in a compressed format according to an encoding scheme to compress numeric-like data types, according to some embodiments.

FIG. 7 is a high-level flowchart illustrating methods and techniques to decompress data that is stored in a compressed format according to an encoding scheme to compress numeric-like data types, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or configurations of systems and devices.

At 704, an indication of a query directed to compressed data stored in a data block of a data store is received. In some cases, the data store may represent a column-oriented data store. For example, referring to FIG. 4, the query 494 may be received from the computing device 492.

At 704, a frame stored in the data block is identified based on the query. For example, referring to FIG. 4, the storage engine 180 may determine that the query 494 is directed to compressed data that is stored in one or more of the frames 425 (e.g., the first frame 430) of the data block 490.

At 706, a minimum value and a mask value stored in the frame is identified. For example, referring to FIG. 4, the encoding engine 110 may identify a particular minimum value and mask value associated with a particular frame (e.g., the first frame 430). As an example, the first frame 430 depicted in FIG. 4 may correspond to the first frame 130 of FIG. 1, having the first minimum value 140 and the first mask value 142 stored in the first frame 130.

At 708, a particular subset of bits (identified as "bit subset(i)" in FIG. 7) stored in the frame is identified. For example, referring to FIGS. 1 and 4, the encoding engine 110 may identify a subset of bits stored in a particular frame. As an example, the first frame 430 depicted in FIG. 4 may correspond to the first frame 130 of FIG. 1, having the first subset of bits 144 associated a first value in the first section 120 of the input data stream 120.

At 710, the mask value may be applied to the particular bit subset to determine a difference from the minimum value. For example, referring to FIGS. 1 and 4, the masker 408 of the encoding engine 110 may apply the first mask value 142 associated with the first frame 130 to the first subset of bits 144. Application of the first mask value 142 may identify a subset of bits that differ from bits of the first minimum value 140. The bit comparator 406 may calculate a difference from the minimum value based on a comparison of the subset of bits to bits of the first minimum value 140.

At 712, a value associated with the particular subset of bits may be determined based on the minimum value and the difference. For example, referring to FIGS. 1 and 4, the difference determiner 404 may determine the first value in the first frame 130 based on the difference determined by the bit comparator 406 and the first minimum value 140.

At 714, the value associated with the particular subset of bits is output. For example, referring to FIG. 4, the encoding engine 110 may provide the value as part of the decompressed data 496 that is provided to the computing device 492 responsive to the query 494.

At 716, the variable i is compared to N (e.g., 64 values per frame) to determine whether additional values are stored in the particular frame. If the value for i is less than N, the value for i is incremented at 718, and the process returns to 708 to identify a next subset of bits (e.g., subset (i+1)) stored in the particular frame. The method may end after iterating through all N values. Alternatively, a next consecutive frame (e.g., the second frame 132 in FIG. 1) may be evaluated in a similar manner.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of using computer resources to implement stored procedures for incremental updates to materialized views as described herein may be executed on one or more computer systems, which may interact with various other devices. One such computer system is illustrated by FIG. 8. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB)

standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Figure 8:
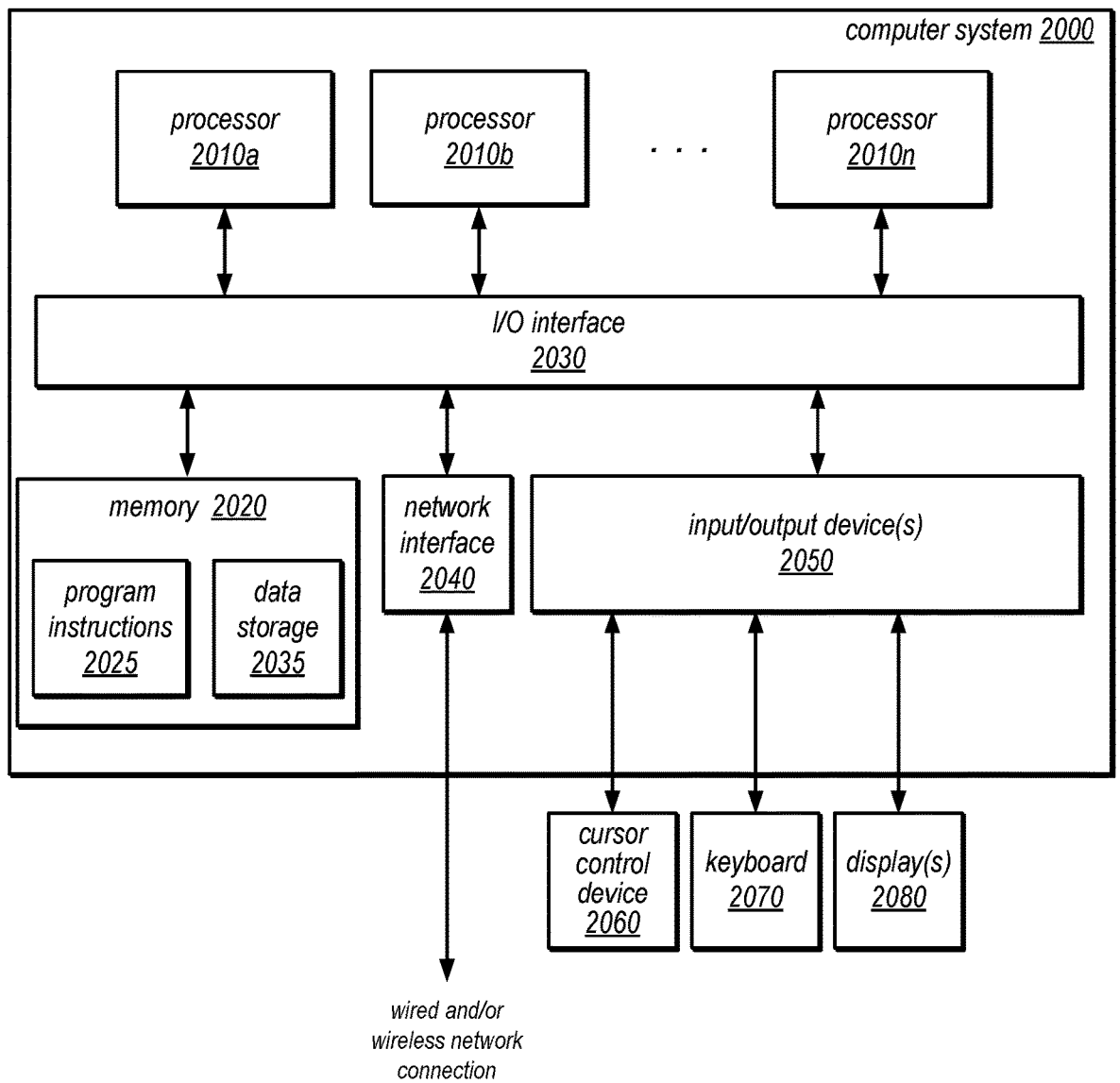
FIG. 8 illustrates an example system to implement the various methods, techniques, and systems described herein, according to some embodiments.

As shown in FIG. 8, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an encoding engine, the encoding engine configured to:
   receive an input data stream that includes a stream of values;
   encode consecutive sections of the input data stream into respective frames, wherein to encode the input data stream in individual ones of the frames, the encoding engine is configured to:
   identify a minimum value in one of the sections of the stream;
   determine, for each value in the one section of the stream, respective differences with the minimum value;
   store in the frame for the one section:
   the minimum value;
   a mask value that is combined with respective portions of the respective differences to generate the respective differences of each value in the one section; and
   the respective portions of the respective differences.

2. The system of claim 1,
   wherein the encoding engine is further configured to:
   identify a different minimum value in a subsequent section of the stream;
   determine, for each value in the subsequent section of the stream, respective differences with the different minimum value;
   store in the frame for the subsequent section:
   the second minimum value;
   a second mask value that is combined with respective portions of the respective differences to generate the respective differences of each value in the subsequent section; and
   the respective portions of the respective differences.

3. The system of claim 2, wherein the minimum value in the one section of the stream is different from the second minimum value in the subsequent section of the stream.

4. The system of claim 1, wherein storing in the frame for the one section includes:
   storing the mask value as an initial value in the frame;
   storing the minimum value as a next value in the frame; and
   storing respective portions of the respective differences as subsequent values in the frame.

5. A method, comprising:
   encoding, by an encoding engine, consecutive sections of a received data stream that includes a stream of values, comprising:
   identifying a minimum value in a section of the stream;
   determining, for each value in the section of the stream, respective differences with the minimum value;
   including in an encoded version of the section:
   the minimum value;
   a mask value that is combined with respective portions of the respective differences to generate the respective differences of each value in the section; and
   the respective portions of the respective differences.

6. The method of claim 5, further comprising:
   storing the encoded version of the section in a data block; and
   storing a null bitmap in the data block, the null bitmap identifying null values in the received data stream.

7. The method of claim 6, wherein the encoded version of the section is stored in one portion of a data block, and wherein the null bitmap is stored in another portion of the data block.

8. The method of claim 7, wherein the storing of the encoded version of the section and the storing of the null bitmap are performed in parallel.

9. The method of claim 6, further comprising compressing the null bitmap using a run-length-encoding (RLE) technique.

10. The method of claim 6, wherein:
    the received data stream includes null values and non-null values;
    the encoded version of the section includes exclusively non-null values; and
    the null values in the received data stream are identified using the null bitmap.

11. The method of claim 5, further comprising:
    decoding, by the encoding engine, the encoded version of the section responsive to receiving a query, the decoding comprising:
    identifying the minimum value and the mask value in the encoded version of the section;
    applying the mask value to the respective portions of the respective differences to determine the respective differences of each value in the section;
    determining, based on the minimum value and the respective differences, each value in the section; and
    providing each value in the section in response to the query.

12. The method of claim 8, wherein the decoding includes utilizing a single instruction, multiple data (SIMD) instruction set to determine each value in the section.

13. The method of claim 12, wherein the SIMD instruction set corresponds to an Advanced Vector Extensions 2 (AVX 2) instruction set or an Advanced Vector Extensions (AVX) 512-bit SIMD instruction set.

14. The method of claim 5, wherein the section of the stream includes a particular number of values, the particular number of values corresponding to at least sixty four (64) values.

15. The method of claim 14, wherein the section of the stream and a next consecutive section of the stream each include a fixed number of values corresponding to the particular number of values.

16. One or more non-transitory, computer-readable storage media, storing program instructions that when executed on or across one or more computing devices cause the one or more computing devices to implement:
    obtaining a data stream that includes a stream of values;
    encoding consecutive sections of the data stream, wherein, in encoding the consecutive sections of the data stream, the program instructions cause the one or more computing devices to implement:
    identifying a minimum value in a section of the stream;
    determining, for each value in the section of the stream, respective differences with the minimum value;

including in an encoded version of the section:
the minimum value;
a mask value that is combined with respective portions of the respective differences to generate the respective differences of each value in the section; and
the respective portions of the respective differences.

17. The one or more non-transitory, computer-readable storage media of claim 16, wherein a subsequent section of the stream includes exclusively non-null values, and wherein an additional byte is stored to identify the subsequent section as including exclusively non-null values.

18. The one or more non-transitory, computer-readable storage media of claim 16, wherein a subsequent section of the stream includes exclusively null values, and wherein an additional byte is stored to identify the subsequent section as including exclusively null values.

19. The one or more non-transitory, computer-readable storage media of claim 16, wherein a subsequent section of the stream includes repeating non-null values, and wherein a run-length-encoding (RLE) technique is used to compress the repeating non-null values.

20. The method of claim 16, wherein a subsequent section of the stream includes repeating null values, and wherein a run-length-encoding (RLE) technique is used to compress the repeating null values.

* * * * *